/ 4/28/87    4,660,936

United States Patent [19]
Nosker

[11] Patent Number: 4,660,936
[45] Date of Patent: Apr. 28, 1987

[54] ARRANGEMENT TO MINIMIZE REFLECTED AMBIENT LIGHT IN A DISPLAY

[75] Inventor: Richard W. Nosker, Princeton, N.J.

[73] Assignee: RCA Corporation, Princeton, N.J.

[21] Appl. No.: 898,112

[22] Filed: Aug. 20, 1986

[30] Foreign Application Priority Data

Jan. 2, 1986 [GB] United Kingdom ............... 8600022

[51] Int. Cl.$^4$ ............................................. G02F 1/13
[52] U.S. Cl. ........................... 350/339 D; 350/339 R; 350/345
[58] Field of Search .................. 350/339 R, 339 D

[56] References Cited

U.S. PATENT DOCUMENTS 3,840,695 10/1974 Fisher ........................... 358/61
4,183,630 1/1980 Funada et al. ............... 350/334

FOREIGN PATENT DOCUMENTS 58-169132 10/1983 Japan ........................... 350/339 D
58-169131 10/1983 Japan ........................... 350/339 D

OTHER PUBLICATIONS

"Multiplexed Twisted Nematic Liquid Crystal Display with Wide-View Angle", A. G. Arellano, IBM Technical Disclosure Bulletin, vol. 20, No. 11B, Apr. 1978.

Primary Examiner—John K. Corbin
Assistant Examiner—Richard F. Gallivan
Attorney, Agent, or Firm—Birgit E. Morris; William J. Burke; Henry Steckler

[57] ABSTRACT

A display comprises means for changing the polarization of light, such as a liquid crystal cell, and has a means for analyzing light on one side thereof. A means for diffusing light is disposed between the cell and the analyzing means. This arrangement results in a higher contrast ratio for the display than for the prior art arrangement having the analyzing means disposed between the cell and the diffusing means.

15 Claims, 3 Drawing Figures

ARRANGEMENT TO MINIMIZE REFLECTED AMBIENT LIGHT IN A DISPLAY

BACKGROUND OF THE INVENTION

The present invention relates to displays and more particularly to liquid crystal displays with minimized reflected ambient light.

As shown in FIG. 1, a prior art liquid crystal display (LCD) 9 typically comprises a means for changing the polarization of light, such as a twisted nematic liquid crystal cell (LCC) 10, with means 11 for illuminating the cell in the transmission mode with polarized light on one side 10b of the LCC 10. The illuminating means 11 typically comprises a source 12 of light that is partially collimated, i.e., in the plane of FIG. 1, and a linear polarizer 13. The source 12 comprises a lamp 12a, such as a line source, and a reflector 12b. The polarization direction of the polarizer 13 is at a 45° angle with respect to the direction of the lamp 12a. Drive means 15 provides an electrical signal to the LCC 10 representing a desired image to be displayed. The midpoint director of the LCC 10 is perpendicular to the line source 12a direction. First means for analyzing the polarization of the transmitted polarized light 14 is positioned on the other side 10a of the LCC 10. The analyzing means 14 has its direction of polarization oriented perpendicular to the direction of polarization of the polarizer 13. A means for diffusing light 16, such as a diffuser screen, is placed between the analyzing means 14 and a viewer 18 to spread out the collimated light, thereby increasing the viewing angle.

In a normally lighted room, the contrast ratio of this arrangement is limited by reflected light 21 formed from ambient incident light 20 reflected off the curved surface 16a of the diffusing screen 16. This normally controls the total light from the display in the dark state, i.e., the screen 16, instead of being perfectly dark when the LCC 10 is in the dark state, provides some minimum light due to the reflected light 21. This is true, even though only about 5 percent (depending upon angle of incidence) of the incident light 20 is reflected from the curved surface 16a, if the ambient incident light 20 is strong enough. The reflected light from the flat surface 16b is not as much of a problem as is the reflected light from the curved surface 16a since the reflection from the surface 16b is typically specular and thus can be arranged to be out of the field of view of a viewer.

It is therefore desirable to have a display that minimizes reflected ambient light and thus provides a higher contrast ratio.

SUMMARY OF THE INVENTION

A display comprises means for changing the polarization of light, means for analyzing light disposed adjacent to said means for changing the polarization, and means for diffusing light disposed between said means for changing the polarization and said analyzing means.

BRIEF DESCRIPTION OF THE DRAWING

Corresponding reference numerals have been given to corresponding elements.

DETAILED DESCRIPTION OF THE PREFERRED EMBODIMENTS

Figure 1:
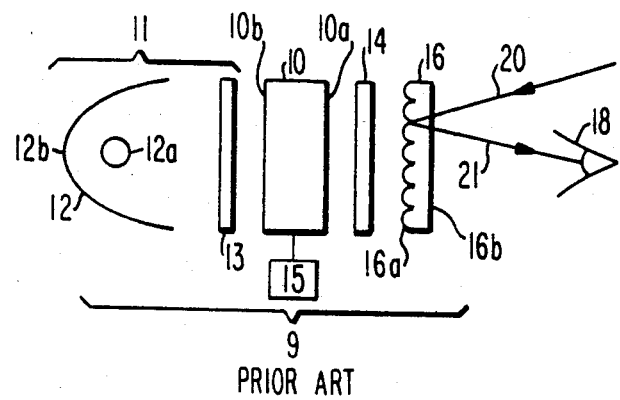
FIG. 1 is a block diagram of a prior art LCD.
Figure 2:
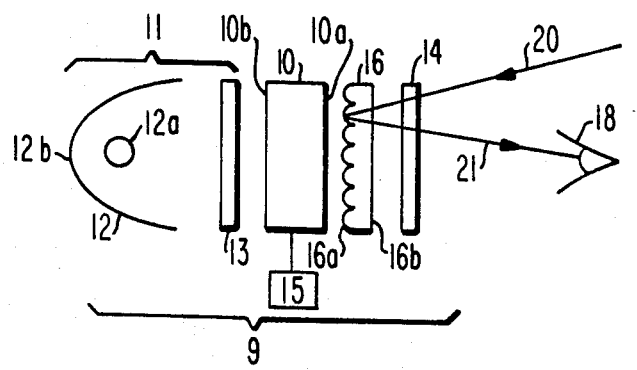
FIG. 2 is a block diagram of an LCD in accordance with a first embodiment of the invention.

FIG. 2 is similiar to FIG. 1 except that the order of the diffusing means 16 and the analyzing means 14 is reversed, i.e., the diffusing means 16 is disposed between the LCC 10 and the analyzing means 14.

The lamp 12a comprises a line source such as a fluorescent tube. The reflector 12b comprises a cylindrical parabolic reflector that substantially collimates light from the tube 12a in the plane of FIG. 2 and does not collimate the light in a direction perpendicular thereto. The polarizing and analyzing means 13 and 14, respectively, each comprise a sheet polarizer such as type HN32 made by the Polaroid Corp., Cambridge, Mass. The LCC 10 is conventional and comprises a pair of transparent opposing substrates (not shown) having patterned transparent electrodes (not shown) and alignment layers (not shown) thereon and a liquid crystal material preferably of the twisted nematic type therebetween, all as known in the art. The LCC 10 can also be of the ferroelectric of magnetoelectric type. The diffusing means preferably comprises a cylindrical lenticular array, such as Item No. 260 made by Lectric Lites Co., Fort Worth, Tex., since it will desirably diffuse in the plane of FIG. 2 and not in a direction perpendicular thereto.

In operation, the incident ambient light 20 is typically unpolarized. The analyzing means 14 transmits about 64 percent of the incident light 20 in the selected polarization direction and near zero percent in the polarization direction perpendicular thereto. The total transmittance is the average of these two values or about 32 percent. When the light is reflected from the surface 16a little change in polarization theoretically occurs. Therefore about 64 percent of the reflected light 21 is transmitted by the analyzing means 14. Thus the reflected light 21 is reduced to 0.64×0.32 or about 0.2 of the incident ambient light 20. Hence the ambient light reflected from the display is decreased by a factor of about 5 as compared with the prior art arrangement of FIG. 1, both for head-on viewing.

It has been found that the diffuser screen 16 can interfere with the polarization of light passing through the LCC 10 on its way to the analyzing means 14, thereby reducing the improvement in the contrast ratio that should occur from the reduction in the ambient light. In this case, the embodiment of FIG. 3 can be used. The diffusing means comprises two stacked diffuser screens 16x and 16y, respectively, to obtain adequate diffusion. A second means for analyzing light 26, such as a sheet polarizer, is disposed between the LCC 10 and the diffusing means 16x and 16y to prevent depolarization by the diffusing means 16x and 16y. The polarization directions of the two analyzing means 14 and 26 are parallel to each other and perpendicular to that of the polarizer 13. Further, a Fresnel lens 24 is disposed at the aperture of the reflector 12b to obtain uniformity of illumination and thus a wide viewing angle of the LCC 10, as disclosed in U.S. patent application No. 890,476 filed July 30, 1986, in the name of the inventor, R. W. Nosker, entitled "Light Box Having a Fresnel Lens". The Fresnel lens 24 and two diffusers can also be used in the embodiment of FIG. 2 and the prior art embodiment of FIG. 1.

A normally lit room provides an illuminance of about 200 lux. In such a room, if the two attached half-cylinder diffusing screens 16x and 16y are oriented so that the room light line sources and the viewer are in the plane of FIG. 3, then the ambient reflected light measures 20 foot-lamberts (ft-1). If the room light line sources are in the plane perpendicular to FIG. 3 and the viewer is in the plane of FIG. 3, then the ambient reflected light measures about 5 ft-1.

For the measurements given below the LCC 10 used Type No. ZL1-2293 (made by E. Merck, Inc., Darmstadt, West Germany) liquid crystal material and had a 4 μm thickness. The polarizer 13 and analyzer 14 were said Type No. HN32, while the second analyzer 26 was Type No. HN42. The diffusers were said Type No. 260.

EXAMPLE NO. 1

Figure 3:
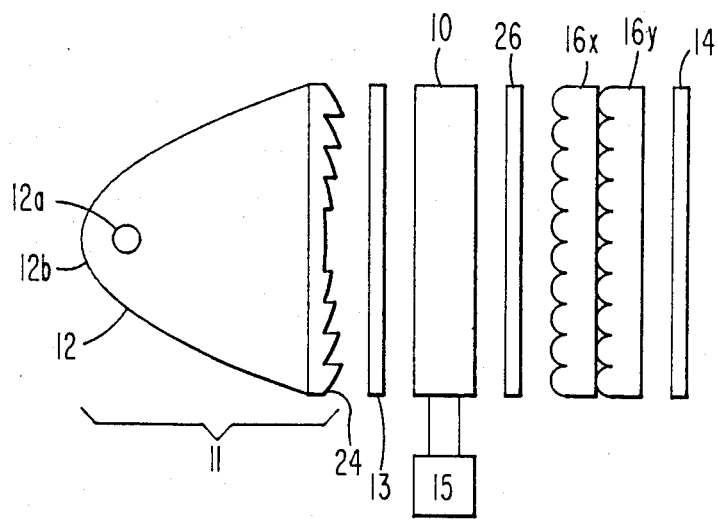
FIG. 3 shows a block diagram of an LCD in accordance with a second embodiment of the invention.

The embodiment of FIG. 3 when the display was transmitting 200 ft-1 of unpatterned light in 20 ft-1 of ambient light had a contrast ratio of about 14:1 with an applied voltage on and off, respectively, as measured using a Model No. 1980A Spectra Pritchard photometer.

EXAMPLE NO. 2

The emobdiment of FIG. 2 with a Fresnel lens at the aperture of the reflector 12b and two diffusers when the display was transmitting 200 ft-1 of light in 20 ft-1 of ambient light had a contrast ratio of about 8.5:1.

COUNTEREXAMPLE NO. 1

In contradistinction, the prior art embodiment of FIG. 1 having a Fresnel lens and two diffusers when the display was transmitting 200 ft-1 of light in 20 ft-1 of ambient light was about 7.3:1.

EXAMPLE NO 3

The embodiment of FIG. 3 when the display was transmitting 100 ft-1 of light in 5 ft-1 of ambient light had a contrast ratio of about 17:1.

EXAMPLE NO. 4

The embodiment of FIG. 2 having a Fresnel lens and two diffusers when the display was transmitting 100 ft-1 of light in 5 ft-1 of ambient light had a contrast ratio of about 9.2:1.

COUNTEREXAMPLE NO. 2

In contradistinction, the prior art embodiment of FIG. 1 having a Fresnel lens and two diffusers when the display was transmitting 100 ft-1 of light in 5 ft-1 of ambient light had a contrast ratio of about 10.5:1. That this contrast ratio is better than that obtained in Example No. 4 is explained by the fact that the diffuser 16 had an effect on the polarization of the light transmitted by the display. However, the embodiment of FIG. 2 with an imperfect diffuser is still useful when the ambient light is strong as shown by Example No. 2. Using a diffuser with less effect on light polarization will result in the embodiment of FIG. 2 possibly being superior to that of FIG. 3 by eliminating light losses in the second analyzer 26.

What is claimed is:
1. A display comprising
   means for changing the polarization of light having first and second opposing sides;
   first means for analyzing light disposed adjacent to said first side; and
   means for diffusing light disposed between said first side and said analyzing means.
2. The display of claim 1 further comprising means for illuminating said polarization changing means disposed adjacent said second side.
3. The display of claim 2 wherein said illuminating means comprises a light source, and means for polarizing light disposed between said light source and said second side.
4. The display of claim 3 wherein said light source comprises a lamp and a reflector adjacent thereto.
5. The display of claim 4 wherein said light source further comprises a Fresnel lens disposed at the aperature of said reflector.
6. The display of claim 4 wherein said lamp comprises a line source.
7. The display of claim 4 wherein said reflector comprises a parabolic reflector.
8. The display of claim 3 wherein said polarizing means comprises a sheet polarizer.
9. The display of claim 2 wherein said illumination means comprises a Fresnel lens.
10. The display of claim 1, wherein said polarization changing means comprises a liquid crystal cell.
11. The display of claim 10 wherein said cell comprises twisted nematic liquid crystal material.
12. The display of claim 1 wherein said diffusing means comprises a first lenticular array.
13. The display of claim 12 wherein said diffusing means further comprises a second lenticular array disposed adjacent said first array.
14. The display of claim 1 wherein said analyzing means comprises a sheet polarizer.
15. The display of claim 1 further comprising a second means for analyzing light disposed between said first side and said diffusing means.

* * * * *

REEXAMINATION CERTIFICATE (1197th)
United States Patent [19]

Nosker

[11] B1 4,660,936

[45] Certificate Issued Jan. 23, 1990

[54] ARRANGEMENT TO MINIMIZE REFLECTED AMBIENT LIGHT IN A DISPLAY

[75] Inventor: Richard W. Nosker, Princeton, N.J.

[73] Assignee: RCA Corporation

Reexamination Request:
No. 90/001,727, Mar. 10, 1989

Reexamination Certificate for:
Patent No.: 4,660,936
Issued: Apr. 28, 1987
Appl. No.: 898,112
Filed: Aug. 20, 1986

[30] Foreign Application Priority Data

Jan. 2, 1986 [GB] United Kingdom ............... 8600022

[51] Int. Cl.$^4$ ............................................. G02F 1/13
[52] U.S. Cl. ....................... 350/339 D; 350/339 R; 350/345
[58] Field of Search ............. 350/339 D, 339 R, 345

[56] References Cited

U.S. PATENT DOCUMENTS

3,799,647  3/1974  Luft .................................. 350/150
4,704,004  11/1987  Nosker ....................... 350/339 R X

FOREIGN PATENT DOCUMENTS

1453733  12/1973  United Kingdom .

OTHER PUBLICATIONS

Webster's Ninth New Collegiate Dictionary (Merriam-Webster 1984), p. 353, entries at "Diffuse" and diffuser.

Primary Examiner—John S. Heyman

[57] ABSTRACT

A display comprises means for changing the polarization of light, such as a liquid crystal cell, and has a means for analyzing light on one side thereof. A means for diffusing light is disposed between the cell and the analyzing means. This arrangement results in a higher contrast ratio for the display than for the prior art arrangement having the analyzing means disposed between the cell and the diffusing means.

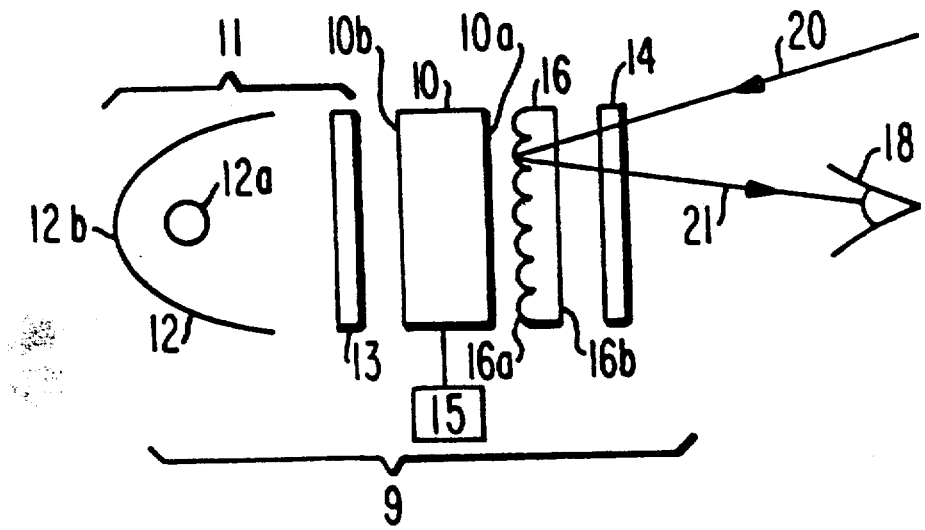

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-5 and 9 having been finally determined to be unpatentable, are cancelled.

Claims 1, 6-8 are determined to be patentable as amended.

Claims 10-15, dependent on an amended claim, are determined to be patentable.

New claims 16-28 are added and determined to be patentable.

1. A display comprising
   means for changing the polarization of light having first and second opposing sides;
   first means for analyzing light disposed adjacent to said first side; [and]
   means for diffusing light disposed between said first side and said analyzing means[.];
   *means for illuminating said polarization changing means disposed adjacent said second side, said illuminating means comprising a light source, a reflector and a Fresnel lens in the proximity of said reflector; and. means for polarizing light disposed between said light source and said second side.*

6. The display of claim [4] *1* wherein said [lamp] *light source* comprises a line source.

7. The display of claim [4] *1* wherein said reflector comprises a parabolic reflector.

8. The display of claim [3] *1* wherein said polarizing means comprises a sheet polarizer.

*16. A display comprising
   means for changing the polarization of light having first and second opposing sides;
   first means for analyzing light disposed adjacent to the first side; and
   means for diffusing light disposed between said first side and said first analyzing means, said diffusing means comprising first and second lenticular arrays disposed adjacent to each other.*

*17. The display of claim 16 further comprising means for illuminating said polarization changing means disposed adjacent said second side.*

*18. The display of claim 17 wherein said illuminating means comprises a light source, and means for polarizing light disposed between said light source and said second side.*

*19. The display of claim 18 wherein said light source comprises a lamp and a reflector adjacent thereto.*

*20. The display of claim 19 wherein said light source further comprises a Fresnel lens disposed at the aperture of said reflector.*

*21. The display of claim 19 wherein said lamp comprises a line source.*

*22. The display of claim 19 wherein said reflector comprises a parabolic reflector.*

*23. The display of claim 18 wherein said polarizing means comprises a sheet polarizer.*

*24. The display of claim 17 wherein said illumination means comprises a Fresnel lens.*

*25. The display of claim 16 wherein said polarization changing means comprises a liquid crystal cell.*

*26. The display of claim 25 wherein said cell comprises twisted nematic liquid crystal material.*

*27. The display of claim 16 wherein said analyzing means comprises a sheet polarizer.*

*28. The display of claim 16 further comprising a second means for analyzing light disposed between said first side and said diffusing means.*

* * * * *